(12) United States Patent
Ver Steeg et al.

(10) Patent No.: US 9,935,991 B2
(45) Date of Patent: Apr. 3, 2018

(54) PIPELINING GET REQUESTS IN ADAPTIVE STREAMING

(71) Applicant: Cisco Technology, Inc., San Jose, CA (US)

(72) Inventors: Bill Ver Steeg, New Smyrna Beach, FL (US); Ali C. Begen, Londong (CA)

(73) Assignee: Cisco Technology, Inc., San Jose, CA (US)

( * ) Notice: Subject to any disclaimer, the term of this patent is extended or adjusted under 35 U.S.C. 154(b) by 359 days.

(21) Appl. No.: 14/881,184

(22) Filed: Oct. 13, 2015

(65) Prior Publication Data

US 2017/0104801 A1    Apr. 13, 2017

(51) Int. Cl.
*G06F 15/16* (2006.01)
*H04L 29/06* (2006.01)
*H04L 29/08* (2006.01)

(52) U.S. Cl.
CPC .......... *H04L 65/60* (2013.01); *H04L 65/1069* (2013.01); *H04L 67/02* (2013.01)

(58) Field of Classification Search
CPC .......... H04L 65/60; H04L 65/65; H04L 67/02
See application file for complete search history.

(56) References Cited

U.S. PATENT DOCUMENTS

| | | | | |
|---|---|---|---|---|
| 9,426,196 B2* | 8/2016 | Stockhammer | .. | H04N 21/23439 |
| 2006/0253546 A1* | 11/2006 | Chang | ............... | G06F 17/30902 |
| | | | | 709/217 |
| 2015/0067137 A1 | 3/2015 | VerSteeg et al. | | |

OTHER PUBLICATIONS

Belshe, M. et al; Hypertext Transfer Protocol Version 2 (HTTP/2)—IETF-RFC7540—May 2015.
Handley, M, et al; TCP Congestion Window Validation—IETF-RFC-2861—Jun. 2000.

* cited by examiner

*Primary Examiner* — Yves Dalencourt
(74) *Attorney, Agent, or Firm* — Samuel M. Katz (57) ABSTRACT

In one embodiment, a client device includes a processor to send a first GET request to a server for a first data chunk of a data item, a communication interface to receive packets of the first data chunk, a buffer to buffer the packets, wherein the processor is operative to obtain a first measure of round trip time (RTT), the processor is operative to estimate a time t1 when receipt of the last packet of the packets of the first data chunk in the buffer will be completed, the processor is operative to determine a next fetch time, t2, to send a second GET request to the server for a second data chunk of the data item, based on the time t1 adjusted by a portion of the first measure of RTT, the processor is operative to send the second GET request to the server at about time t2.

20 Claims, 7 Drawing Sheets

PIPELINING GET REQUESTS IN ADAPTIVE STREAMING

TECHNICAL FIELD

The present disclosure generally relates to pipelining of GET requests in adaptive streaming.

BACKGROUND

An adaptive bit rate (ABR) streaming client typically balances a need to pipeline GET requests (in order to keep the pipe full and maximize throughput) with a need to gather throughput data (in order to determine the rate of the next fetch in order to be responsive to congestion signals and make upshift/downshift decisions). This is particularly important when the client is trying to grow the amount of data in the client's playback buffer. When the GET is active, Transmission Control Protocol (TCP) is operative to fill the pipe and thus on certain networks the network buffers become full. The round trip time (RTT) from the client to the server and back to the client is different at the end of the data fetch than at the start. It can be substantially different. Each subsequent fetch can build additional delay into the system. In fact, on poorly designed tail drop systems, the delay may deterministically build up until it reaches the limits of the buffer, and then level-out at that value. Variable cross traffic may also cause variable delay for the ABR flow. A very naive client may simply wait until the current chunk arrives in its entirety, calculate the network rate, determine the rate for the next chunk, and then fetch the next chunk. This causes approximately one RTT of dead time on the network. A slightly more effective client will pipeline the GETs by fetching the next chunk at a fixed offset from the end of the current chunk. This is better than waiting until the current chunk arrives in its entirety.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present invention a client device including a hardware processor to send a first GET request for a first data chunk of a data item to a server, a communication interface to receive a plurality of packets of the first data chunk, a buffer to buffer the packets of the first data chunk, wherein the hardware processor is operative to process the first data chunk for outputting data to an output device, the hardware processor is operative to obtain a first measure of round trip time (RTT) from the client device to the server and back to the client device, the hardware processor is operative to estimate a time t1 when receipt of the last packet of the packets of the first data chunk in the buffer will be completed, the hardware processor is operative to determine a next fetch time, t2, to send a second GET request to the server for a second data chunk of the data item, based on the time t1 adjusted by a portion of the first measure of RTT, the hardware processor is operative to send the second GET request to the server for the second data chunk of the data item at about the time t2, the communication interface is operative to receive a plurality of packets of the second data chunk, the buffer is operative to buffer the packets of the second data chunk, and the hardware processor is operative to process the second data chunk for outputting data to the output device.

DETAILED DESCRIPTION

Figure 1:
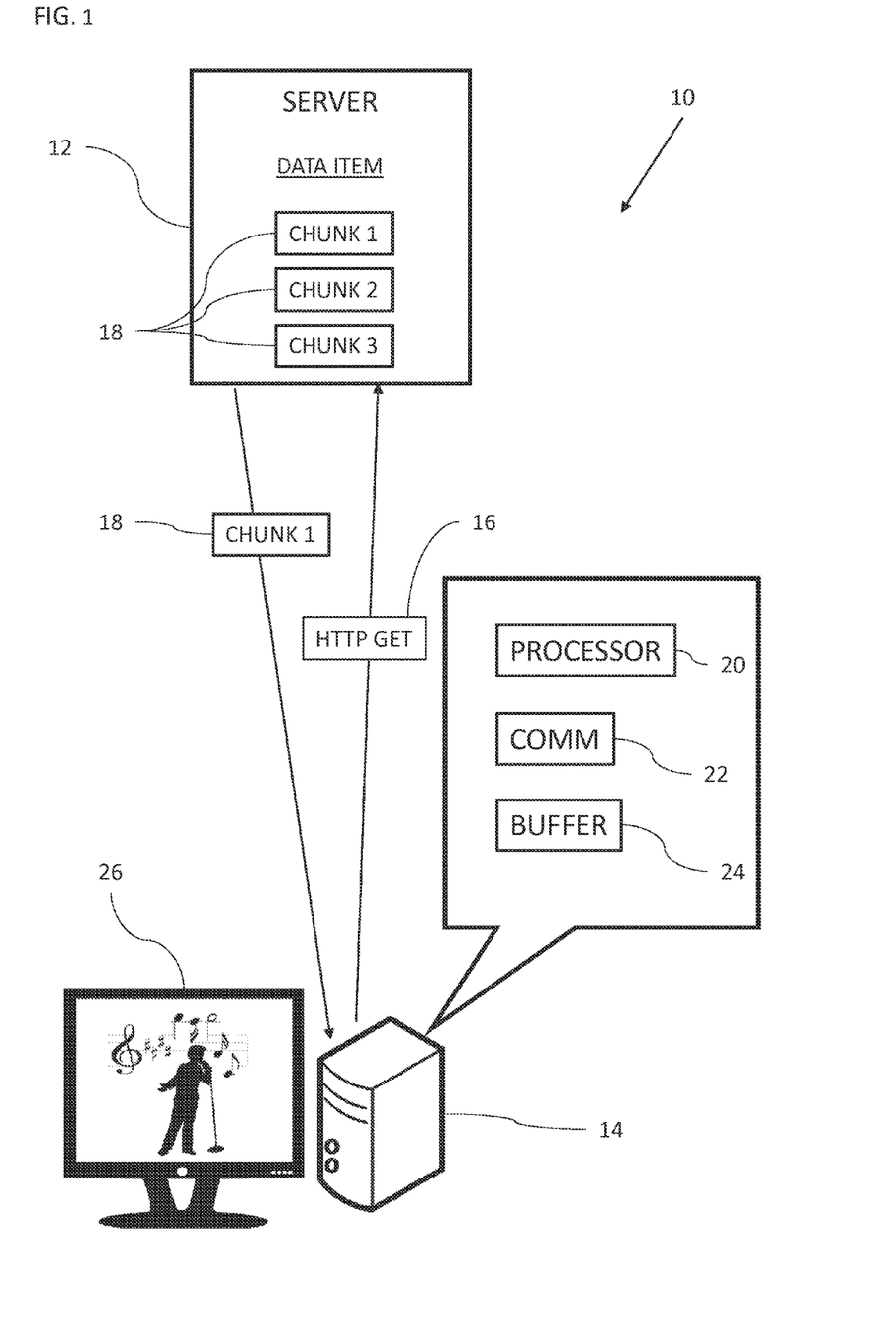
FIG. 1 is a partly pictorial, partly block diagram view of a client-server system pipelining HTTP GETs constructed and operative in accordance with an embodiment of the present disclosure.

Reference is now made to FIG. 1, which is a partly pictorial, partly block diagram view of a client-server system 10 pipelining Hypertext Transfer Protocol (HTTP) GETs constructed and operative in accordance with an embodiment of the present disclosure. The client-server system 10 is described herein with respect to HTTP, Transmission Control Protocol TCP, GET requests, HEAD commands and responses. It will be appreciated that the client-server system 10 may be implemented using any suitable transfer protocol in the application and transport layer and any suitable commands with similar functionality may replace GET requests and HEAD commands. The terms "GET request" and 'HEAD command" used in the specification and claims, are defined to include a GET-like request and HEAD-like command, respectively, in HTTP or non-HTTP protocols, providing the functionality to perform the functions described herein for the GET request and HTTP command, respectively. The client-server system 10 includes a server 12 and a plurality of clients 14 (only one client 14 is shown in FIG. 1 for the sake of simplicity). The server 12 serves content, which is broken down into a plurality of chunks 18, to the clients 14. The client 14 of FIG. 1 is shown sending an HTTP GET request 16 for chunk 1 of a data item to the server 12. The server 12 is shown serving chunk 1 to the client 14 of FIG. 1. It should be noted that a load balancer may be in place in the network, and that the server 12 (referred to by the client 14 as the same server 12) may in fact be different servers that are periodically assigned by the load balancer to the client 14, thereby adding another source of variable delay to the overall system. In an adaptive streaming bit rate environment each part of a content item may include different chunks for serving at different bitrates according to the network conditions between the server 12 and the various clients 14. Each client 14 includes a hardware processor 20, a communication interface 22 and a buffer 24. The hardware processor 20 is operative to prepare the HTTP GET requests and send the HTTP GET requests via the communication interface 22 and perform other processing tasks described in more detail below with reference to FIGS. 2-8. The communication interface 22 is operative to convey the HTTP GET requests sent to the server 12 by the hardware processor 20 and to receive data sent from the server 12. The buffer 24 is operative to buffer data received from the server 12. The received data may be any suitable data, for example, but not limited to, video content, audio content, stock quote data or health reading data. The data may be processed for output on a suitable output device 26, for example, but not limited to, a computer monitor, a video display screen, a mobile telephone screen or speaker system.

As described above, an adaptive bit rate (ABR) streaming client typically balances a need to pipeline HTTP GET requests (in order to keep the pipe full and maximize throughput) with a need to gather throughput data (in order to determine the rate of the next fetch in order to be responsive to congestion signals and make upshift/downshift decisions or stay at the same bitrate). This is particularly important when the client is trying to grow the amount of data in the local buffer. When the HTTP GET is active, Transmission Control Protocol (TCP) tries to fill the pipe and thus on certain networks the network buffers build up, possibly leading to network buffer bloat. The inventors believe that optimal delay corresponds to the upstream delay which may be approximated by ½ round trip time (RTT). If the client 14 picks a time value that is too short, the clients 14 may not determine the best possible estimate of network throughput, possibly leading to a poor bandwidth estimation and thus to a sub-optimal data rate (e.g., video rate in a video playing client). If the client 14 picks a time value that is too long, there may be a gap in the data flow and the client 14 may not get the best possible throughput. It should be noted that network buffer bloat is not the only cause of variable delay. Changes in the network, including re-route, load balancing, roaming and wireless forward error correction (FEC) can impact delay.

Generally, each client 14 is operative to obtain a measure of RTT. One method to obtain the measure of RTT is to measure the delay from issuing a GET request for a chunk 18 and receiving the first byte of data of that chunk 18. This delay would correspond to a measure of RTT. Other methods for determining a suitable measure of RTT are described below with reference to FIGS. 2-8. A next fetch time to send the HTTP GET for the next chunk 18 is based on an estimate of when the currently received chunk 18 will be received in its entirety adjusted by (e.g., minus) a portion of the measure of RTT. The portion of the RTT used in the next fetch time calculation is typically 0.5 of the RTT based on the assumption that upstream delay is typically 0.5 of the measure of RTT. The portion of the RTT used in the next fetch calculation may be adjusted, for example, but not limited to, for upstream delay, discussed in more detail below. The portion of the RTT used to calculate the timing may vary from 0.4 to 0.6 or even from 0.2 to 0.8 of the RTT. It should be noted that wherever 0.5 of the RTT is mentioned in this specification, it is only an example, and the portion of the RTT may be in the range of 0.4 to 0.6 or even from 0.2 to 0.8 of the RTT.

The client-server system 10 is particularly useful in an ABR system where the clients 14 are rate adaptive video clients. However, the client-server system 10 may be useful in any suitable data streaming application where the next data chunk depends on consumption of the previous data chunk, for example, but not limited to, stock quotes, health data transfer (e.g. during heart surgery), telemetry.

Figure 2:
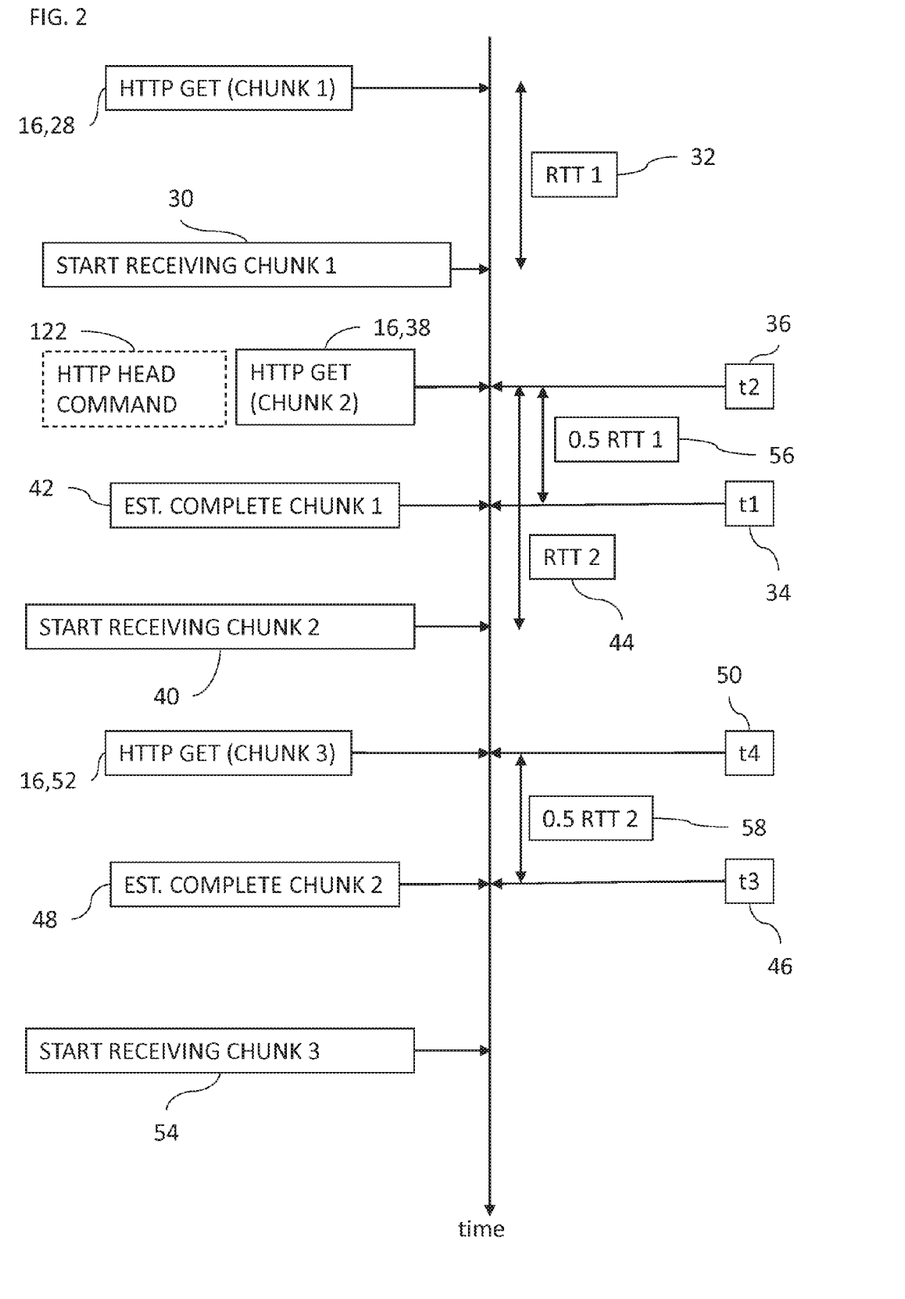
FIG. 2 is a time line diagram of an exemplary method of operation of the system of FIG. 1 pipelining HTTP GETs.

Reference is now made to FIG. 2, which is a time line diagram of an exemplary method of operation of the system 10 of FIG. 1 pipelining HTTP GETs 16. As described above, one method to obtain a measure of RTT is to measure the delay from issuing a GET for a chunk until receiving the first byte/packet of data of that chunk. This delay would correspond to the RTT. It is relatively easy to measure this delay as the code running on the hardware processor 20 (FIG. 1) can store in memory (not shown) the time at which the hardware processor 20 sent the GET request 16 and the hardware processor 20 may also store in memory the time at which the first byte/packet of data associated with the GET request 16 is received in the buffer 24 (FIG. 1). The hardware processor 20 then determines the next GET request 16 to be ½ the RTT back in time from when it is estimated that the current fetch for the current chunk will be completed. The above processing may be repeated for each chunk, so that the RTT measurement is repeated for each chunk 18, providing a dynamically changing next fetch timing. The dynamically changing timing method provides an improvement over static methods in that it tracks RTT variability for every chunk being fetched. Some very poorly designed networks start out with a very small RTT, then slowly build up the tail-drop buffer in the network until the tail-drop buffer hits a very large value. The dynamically changing timing method of the present application should track that build up and provide better timing for the next HTTP GET 16 than using a fixed offset to determine the next fetch time, but it may ignore middlebox buffer change over the duration of the current chunk. The above method works for both HTTP 1.1 and HTTP/2 and without head of line blocking issues.

An exemplary method of pipelining HTTP GET requests 16 is now described with reference to FIG. 2. The hardware processor 20 (FIG. 1) is operative to prepare an HTTP GET request 28 for chunk 1 of the data item and send the HTTP GET request 28 to the server 12 via the communication interface 22 (FIG. 1). The communication interface 22 is operative to receive thereon a plurality of packets (not shown) of data chunk 1 (block 30). The buffer 24 (FIG. 1) is operative to buffer the packets of data chunk 1. The hardware processor 20 is operative to process data chunk 1 for outputting data to the output device 26 (FIG. 1). The hardware processor 20 is operative to obtain a measure of RTT, designated RTT 1 (block 32), from the client device 14 to the server 12 and back to the client device 14, based on measuring the time between sending the HTTP GET request 28 and receiving an initial part (e.g., a first byte or a first packet) of data chunk 1 in the buffer 24. Other methods for obtaining a measure of RTT are described herein below. Each of the methods described herein below may be used instead of, or in addition to, the above mentioned method of obtaining a measure of RTT. The hardware processor 20 is operative to estimate a time t1 (block 34) when receipt of the last packet of the packets of the data chunk 1 in the buffer 24 will be completed (block 42). Estimation of time t1 (block 34) may be performed, by way of example only, based on a known chunk duration or size and a current download bandwidth. The hardware processor 20 is operative to determine a next fetch time, t2 (block 36), to send an HTTP GET request 38 to the server 12 for data chunk 2 of the data item, based on time t1 adjusted by (e.g., minus) a portion (block 56) (e.g., 0.5) of RTT 1 (block 32). The hardware processor 20 is operative to send the HTTP GET request 38 to the server 12 for data chunk 2 of the data item at about time t2 (block 36) via the communication interface 22. The term "at about", as used in the claims and specification, is defined to include performing an action at a certain time or within a range around that certain time, for example, plus or minus 20% of the most recently calculated RTT from the certain time. The communication interface 22 is operative to receive thereon a plurality of packets of data chunk 2 (block 40). The buffer 24 is operative to buffer the packets of data chunk 2. The hardware processor 20 is operative to process data chunk 2 for outputting data to the output device 26. The hardware processor 20 is operative to obtain a measure of RTT, designated RTT 2 (block 44), from the client device 14 to the server 12 and back to the client device 14. The hardware processor 20 is operative to estimate a time t3 (block 46) when receipt of the last packet of the packets of the data chunk 2 in the buffer 24 will be completed (block 48). The hardware processor 20 is operative to determine a next fetch time, t4 (block 50), to send an HTTP GET request 52 to the server 12 for data chunk 3 of the data item, based on the time t3 adjusted by (e.g., minus) a portion (block 58) (e.g., 0.5) of RTT 2 (block 44). The hardware processor 20 is operative to send the HTTP GET request 52 to the server 12 for data chunk 3 of the data item at about time t4 (block 50) via the communication interface 22. The communication interface 22 is operative to receive thereon a plurality of packets of data chunk 3 (block 54). The buffer 24 is operative to buffer the packets of data chunk 3. The hardware processor 20 is operative to process data chunk 3 for outputting data to the output device 26 and so on for each of the chunks of the data item. It should be noted that RTT 1 and RTT 2 are generally different, leading to a dynamic calculation of the next fetch time for each chunk of the data item. The portion of the RTT used to calculate the next fetch timing, for each chunk, may be in the ranges of 0.4 to 0.6 or even in the range of 0.2 to 0.8 times the measure of that RTT.

The hardware processor 20 (FIG. 1) may be operative to obtain RTT 1 based on measuring the time it takes to connect to the server 12. The hardware processor 20 (FIG. 1) may be operative to obtain RTT values as follows. The hardware processor 20 is operative to: open a new HTTP session in parallel to the session already open for receiving the data item; send an HTTP GET request to the server 12 for another piece of data on the new HTTP session; and determine a measure of RTT from the client device 14 to the server 12 and back to the client device 14 based on a delay between sending the HTTP GET request for other data item and receiving an initial part of that piece of data.

Figure 3:
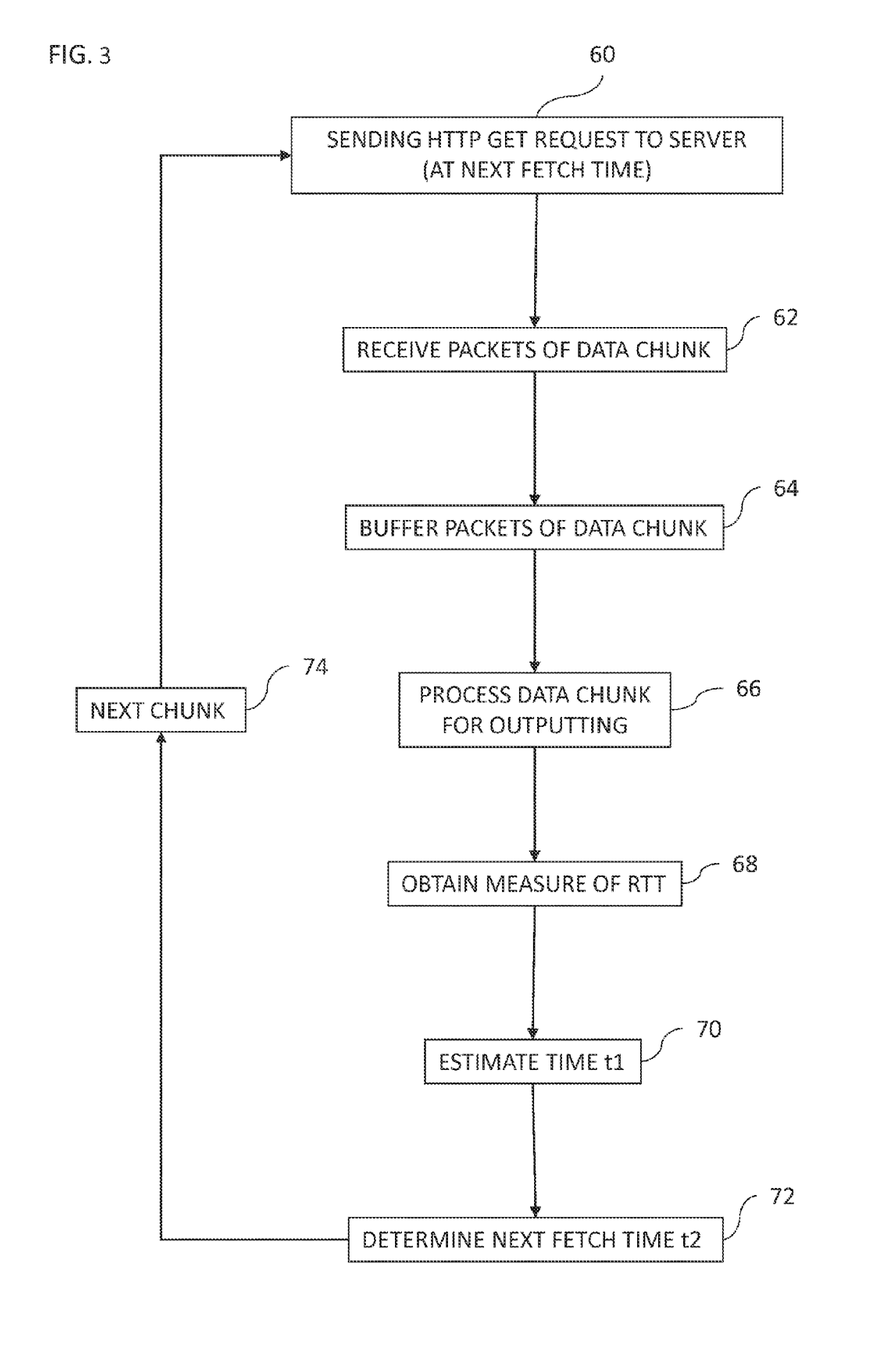
FIG. 3 is a flow chart of an exemplary method of operation of the system of FIG. 1 pipelining HTTP GETs.

Reference is now made to FIG. 3, which is a flow chart of an exemplary method of operation of the system 10 of FIG. 1 pipelining HTTP GETs. FIG. 3 shows that for each data chunk, currently being received, the following is performed. The hardware processor 20 (FIG. 1) is operative to send an HTTP GET request to the server 12 (FIG. 1) for that data chunk (block 60). The communication interface 22 (FIG. 1) is operative to receive packets of that data chunk (block 62). The buffer 24 (FIG. 1) is operative to buffer the packets of that data chunk (block 64). The hardware processor 20 is operative to process that data chunk for outputting to the output device 26 (FIG. 1) (block 66). The hardware processor 20 is operative to obtain a measure of RTT (block 68). The hardware processor 20 may be operative to obtain the measure of RTT by measuring the time between sending the HTTP GET request for that data chunk and receiving an initial part of that data chunk in the buffer 24 (FIG. 1) yielding a measure of RTT (from the client device 14 (FIG. 1) to the server 12 and back to the client device 14) associated with that data chunk. The hardware processor 20 is operative to estimate a time t1 when receipt of the last packet of that data chunk currently being received in the buffer 24 will be completed (block 70). The hardware processor 20 is operative to determine a next fetch time, t2, to send an HTTP GET request to the server 12 for the next data chunk of the data item, based on the time t1 adjusted by (e.g., minus) a portion (e.g., ½) of the measure of RTT associated with that data chunk currently being received (block 72). The steps described with reference to blocks 60-72 are repeated for the next chunk (block 74).

Figure 4:
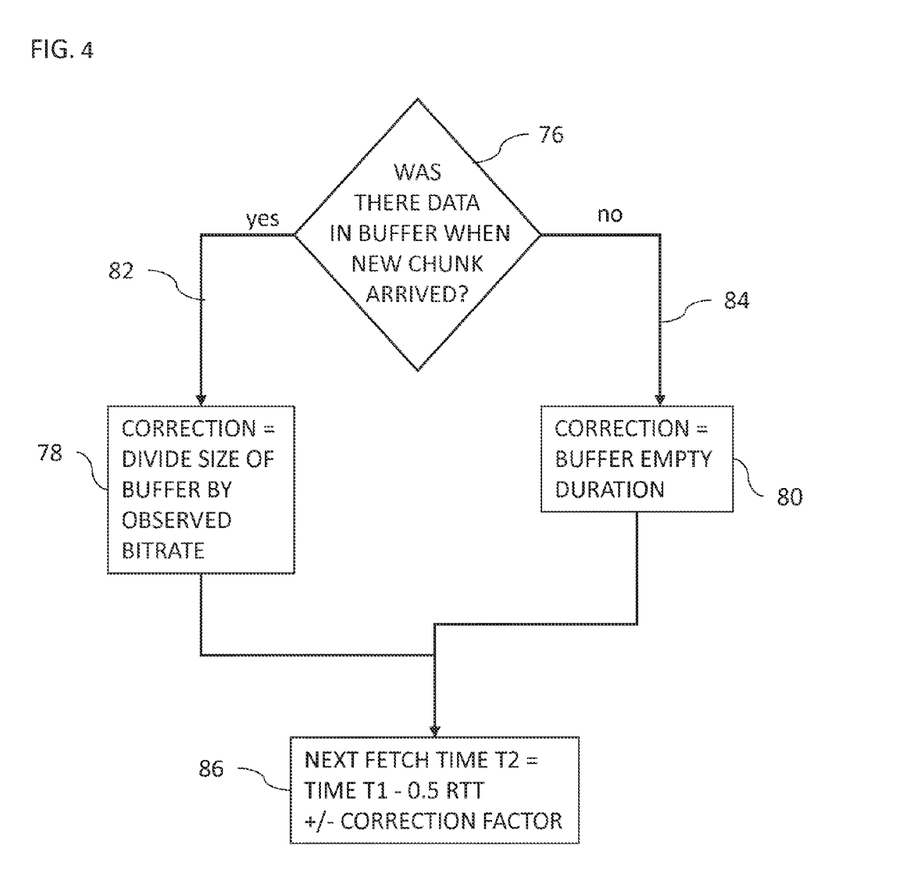
FIG. 4 is a flow chart of an exemplary method for correcting for upstream delay in the system of FIG. 1.

Reference is now made to FIG. 4, which is a flow chart of an exemplary method for correcting for upstream delay in the system 10 of FIG. 1. For HTTP 1.1 the portion of the RTT used in the next fetch timing may be fine-tuned based on upstream delay rather than using ½ of the total RTT. If the timing of the HTTP GET were exactly correct, the size of a receive queue of the buffer 24 (FIG. 1) would be zero when the last byte of the previous chunk is read and the next read from the buffer 24 would immediately return with the new chunk. If the HTTP GET were sent early, the buffer 24 would have data in it when the old chunk finished. If the HTTP GET were sent late, there would be a delay in receiving the next chunk. The time skew can be calculated by analyzing behavior of the buffer 24. If there is data in the buffer 24, the time skew may be approximated by dividing the size of the buffer 24, by the recently observed bitrate of consumption of the data item. The size of the buffer 24 may be obtained through a system call to get the socket options, where the call could be getsockopt( ) in certain systems or another function in other systems. If the buffer 24 is empty for a while after the previous read completes, the time skew can be approximated by the amount of time the session is idle. The skew values can be used to bias the ½ RTT obtained using any of the methods described herein. This correction is now described in more detail. The hardware processor 20 (FIG. 1) first determines whether there is data in the buffer 24 when the new chunk arrived in the buffer 24 (decision block 76). If the answer to the query of decision block 76 is "yes" (branch 82), then the hardware processor 20 is operative to calculate a correction factor based on dividing a size of the buffer 24 by an observed bitrate of consumption of the data item (block 78). If the answer to the query of decision block 76 is "no" (branch 84), then the hardware processor 20 is operative to calculate the correction factor based on the time duration that the buffer 24 was empty between consuming the previous data chunk and the next (currently being received) data chunk (block 80). The hardware processor 20 is operative to determine the next fetch time, t2, to send the next HTTP GET request to the server 12 (FIG. 1) for the next data chunk of the data item, based on the time t1 adjusted by (e g, minus) a half of the measure of RTT plus the correction factor for upstream delay from the client 14 device to the server 12 (if branch 82 was followed) or minus the correction factor for upstream delay from the client 14 device to the server 12 (if branch 84 was followed) (block 86).

Figure 5:
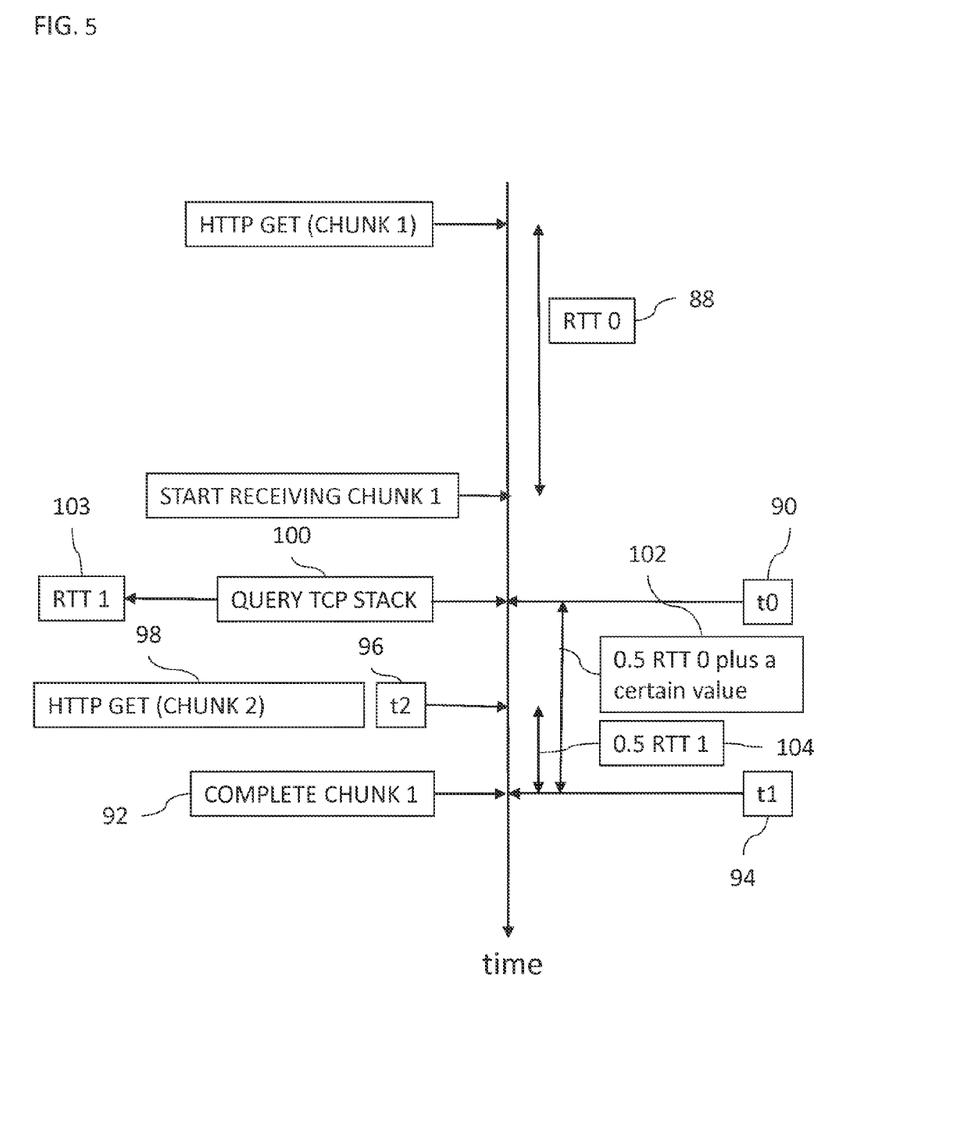
FIG. 5 is a time line diagram of an exemplary method to fine tune a next fetch determination in the system of FIG. 1.

Reference is now made to FIG. 5, which is a time line diagram of an exemplary method to fine tune a next fetch determination in the system 10 of FIG. 1. A method to fine tune the next fetch determination includes obtaining two measures of RTT. The first measure of RTT (RTT 0) is used to determine a time to obtain the second measure of RTT (RTT 1) which is used to determine the next fetch time. This method is now described in more detail. An initial measure of RTT, RTT 0 (block 88), is obtained. A time, t0 (block 90), is determined based on the estimated completion of chunk 1 (block 92) at time t1 (block 94) less ½ (or another suitable portion) of RTT 0 (block 88) less a certain value and optionally an adjustment for upstream delay (block 102). Time t0 represents a time which is "slightly before" by the "certain value" a next fetch time determined based on RTT 0. The timing of "slightly before" of the "certain value" may be configurable, but may be ⅕, ⅒, or 1/20 of RTT 0, by way of example only. Another measure of RTT is obtained at about time t0, for example, but not limited to, by querying the TCP stack (block 100) (described in more detail with reference to FIG. 7) or using an HTTP HEAD command (described in more detail with reference to FIG. 8) yielding a measure of RTT 1 (block 103). The next fetch time t2 (block 96) is then calculated based on ½ (or another suitable portion) (block 104) of RTT 1 back from the estimated completion of chunk 1 (block 92) at time t1 (block 94) which is optionally adjusted for upstream delay. A next GET request 98 is then sent at about time t2 (block 96).

Figure 6:
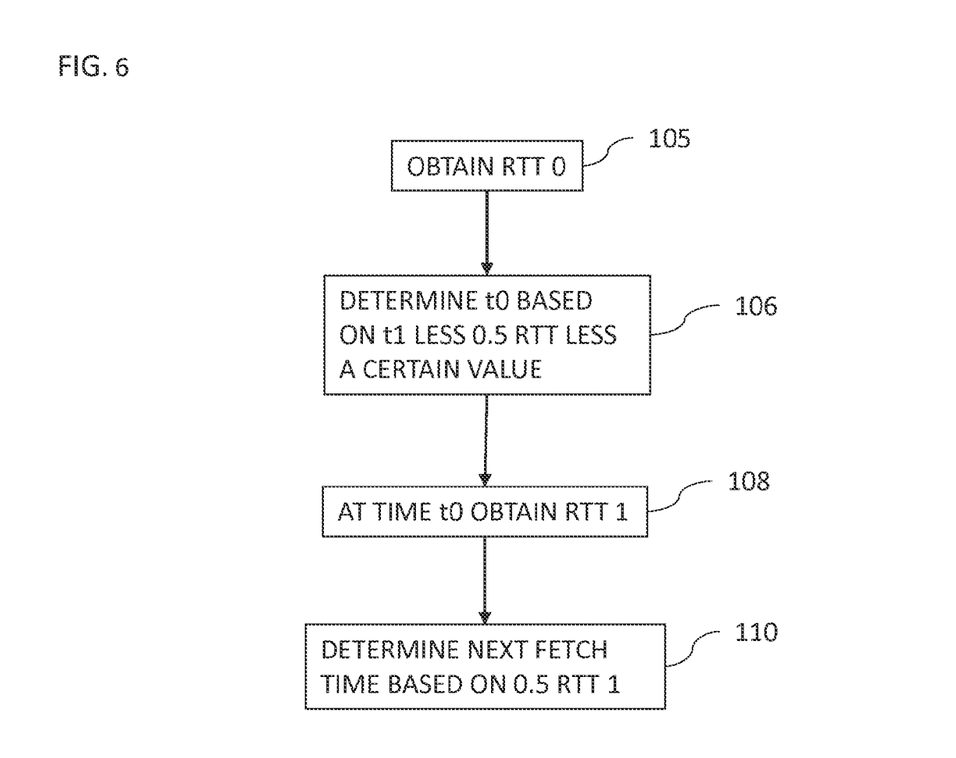
FIG. 6 is a flow chart of the exemplary method to fine tune the next fetch determination in the system of FIG. 1.

Reference is now made to FIG. 6, which is a flow chart of the exemplary method of FIG. 5 to fine tune the next fetch determination. The hardware processor 20 (FIG. 1) is operative to determine a timing of obtaining RTT 1 based on an initial measure of RTT, denoted RTT 0, including: obtaining RTT 0 from the client device 14 (FIG. 1) to the server 12 (FIG. 1) and back to the client device 14 (block 105); determine the time, t0, based on the time t1 adjusted by (e.g., minus) a portion (e.g., ½) of RTT 0 less a certain value (described above in more detail with reference to FIG. 5) (block 106); at about the time t0, obtain RTT1 (block 108); and determine the next fetch time, t2 based on a portion (e.g., ½) of the RTT1 back from t1 (block 110).

Figure 7:
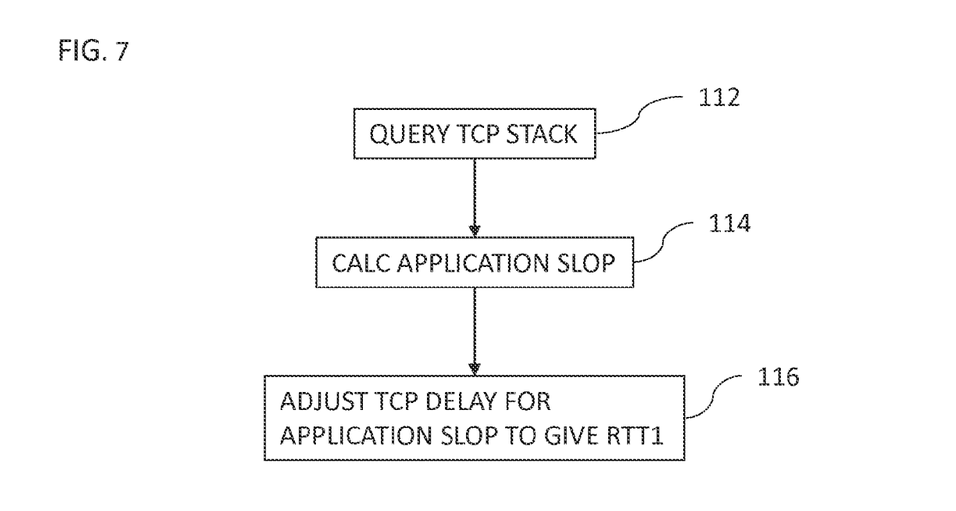
FIG. 7 is a flow chart of an exemplary method of calculating RTT based on a TCP stack query in the system of FIG. 1.

Reference is now made to FIG. 7, which is a flow chart of an exemplary method of calculating RTT based on a TCP stack query in the system 10 of FIG. 1. The RTT may be obtained by the hardware processor 20 (FIG. 1) based on the hardware processor 20 querying a TCP stack in the kernel of the operating system running on the hardware processor 20 for a measure of TCP delay (TCP RTT) and receiving a response from the TCP stack with the TCP delay (block 112). The TCP delay may be retrieved through a system call to get the socket options, where the call could be getsockopt( . . . ,SOL_TCP, TCP_INFO, . . . ) on certain systems or another function in other systems. The TCP delay may then be adjusted for application slop which is delay due to the application's responsiveness. Application slop is first determined (block 114) and then the hardware processor 20 is operative to adjust the TCP delay for application slop yielding RTT 1 (block 116). The application slop may be determined by querying the kernel for the TCP RTT at about the same time as doing an HTTP fetch (GET or HEAD). The hardware processor 20 then measures the HTTP fetch time and subtracts the TCP RTT from the fetch time giving application slop time. The calculated slop time may then be added to subsequent TCP RTTs to give a better approximation of expected application level RTT.

Figure 8:
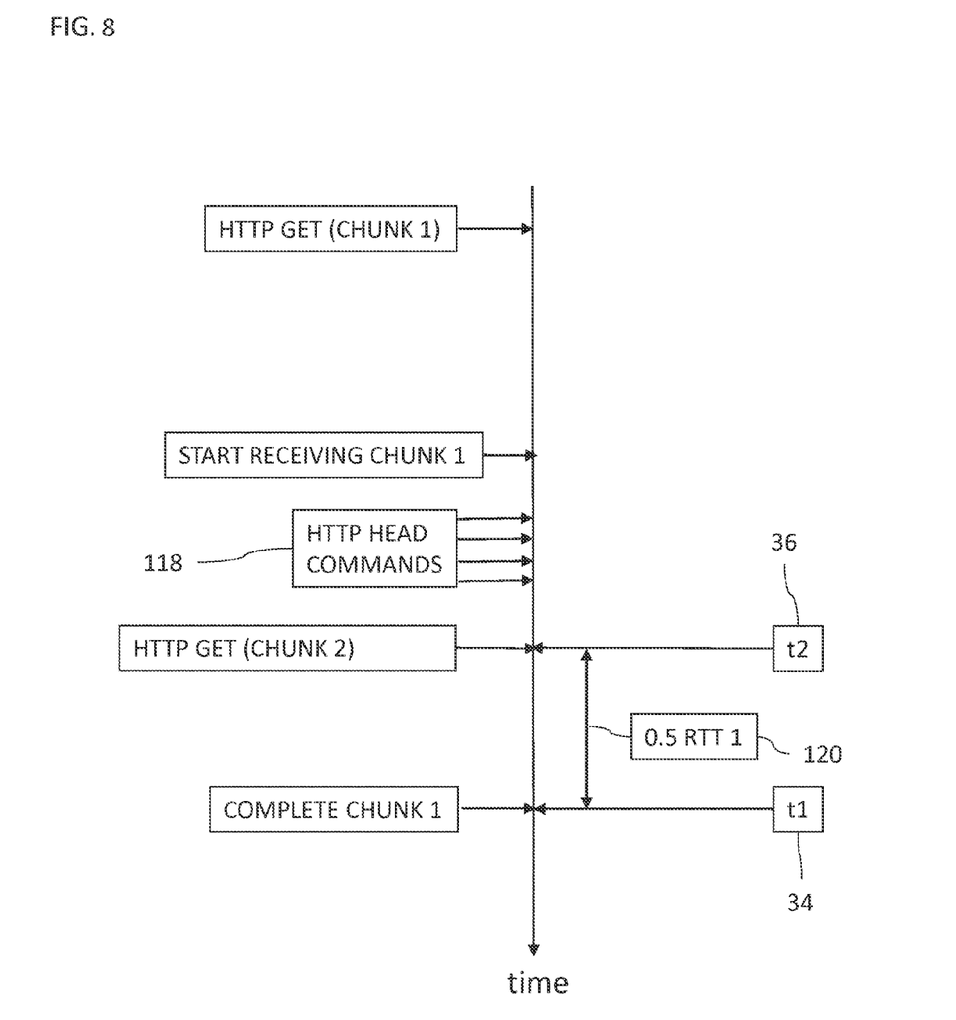
FIG. 8 is a time line diagram of an exemplary method to fine tune a next fetch based on multiple HTTP HEAD commands in the system of FIG. 1.

Reference is now made to FIG. 8, which is a time line diagram of an exemplary method to fine tune a next fetch based on multiple HTTP HEAD commands 118 in the system 10 of FIG. 1. With HTTP/2 an estimate may be obtained for RTT by issuing an HTTP HEAD command. The HEAD response does not suffer from application head of line blocking, and should give a reliable application-level RTT. Therefore, multiple HTTP HEAD commands 118 may be sent by the hardware processor 20 (FIG. 1). Each HEAD command is typically sent after a delay from sending a previous HEAD command, until the last HTTP HEAD command 118 is close enough to the next fetch time, as will now be described in more detail below. While a data chunk (e.g., data chunk 1) is being received in the buffer 24 (FIG. 1), the hardware processor 20 is operative to: issue the multiple HTTP HEAD commands 118; receive a corresponding plurality of HTTP HEAD responses (not shown) in response to the HTTP HEAD commands 118 yielding a plurality of measurements of RTT; check each measurement of RTT to determine if t1 (block 34) adjusted by (e.g., minus) a certain portion (e.g., 0.5) of that measurement of RTT is within a certain limit of the current time; and assign the measurement of RTT that is within the certain limit of the current time as RTT 1 for determining the next fetch time, t2 (block 36). For example, if t1 (block 34) minus ½ of an RTT is within X milliseconds of the current time, then t2 (block 36) will be calculated as t1 less ½ of that RTT (block 120). It will be appreciated that the HTTP HEAD commands 118 may be sent as frequently as desired based on a tradeoff between accuracy of the next fetch time calculation and bandwidth being used by the HTTP HEAD commands 118.

Reference is again made to FIG. 2. For HTTP 1.1, an HTTP HEAD command 122 may be issued by the hardware processor 20 (FIG. 1) at about time t2 (block 36) to apply a correction to the RTT for the next fetch after the HEAD command response is received in the buffer 24 (FIG. 1). If the HEAD command response is in the buffer 24 (FIG. 1) directly after the chunk data, it is known that the RTT estimate was equal to or less than the correct value. If the HEAD command response is in the buffer 24 after a delay, it is known that the RTT estimate was greater than the actual RTT. This information could be used to fine tune the RTT estimate according to the timing of the HEAD command response in the buffer 24. It may be more effective to issue an HTTP HEAD request on a separate socket to the same host, as head of line blocking may distort the RTT measurement if there is substantial data still unsent on the server 12. However, timing on a different socket may be different than the socket for receiving the data item due to caching configurations. Traffic through the new socket may also be routed on a different path in a highly network address translated network. The hardware processor 20 is operative to: issue the HTTP HEAD command 122 at about the time t2 (block 36); receive a corresponding HTTP HEAD response (not shown) in the buffer 24 in response to the HTTP HEAD command 122; determine if the HTTP HEAD response was received in the buffer 24 while there was still data of data chunk 1 in the buffer 24; and fine-tune the next fetch time, t4 (block 50) based on whether or not the HTTP HEAD response was received in the buffer 24 while there was still data of data chunk 1 in the buffer 24.

In practice, some or all of these functions of the client-server system 10 may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A client device comprising:
a hardware processor operative to send a first GET request for a first data chunk of a data item to a server;
a communication interface operative to receive a plurality of packets of the first data chunk;
a buffer operative to buffer the packets of the first data chunk, wherein:
the hardware processor is operative to process the first data chunk for outputting data to an output device;
the hardware processor is operative to obtain a first measure of round trip time (RTT) from the client device to the server and back to the client device;
the hardware processor is operative to estimate a time t1 when receipt of the last packet of the packets of the first data chunk in the buffer will be completed;
the hardware processor is operative to determine a next fetch time, t2, to send a second GET request to the server for a second data chunk of the data item, based on the time t1 adjusted by a portion of the first measure of RTT;
the hardware processor is operative to send the second GET request to the server for the second data chunk of the data item at about the time t2;
the communication interface is operative to receive a plurality of packets of the second data chunk;
the buffer is operative to buffer the packets of the second data chunk; and
the hardware processor is operative to process the second data chunk for outputting data to the output device.

2. The device according to claim 1, wherein the portion of the first measure of RTT is in the range of 0.2 to 0.8 times the first measure of RTT.

3. The device according to claim 1, wherein the portion of the first measure of RTT is in the range of 0.4 to 0.6 times the first measure of RTT.

4. The device according to claim 1, wherein the hardware processor is operative to:
obtain a second measure of RTT from the client device to the server and back to the client device;
estimate a time t3 when receipt of the last packet of the packets of a data chunk currently being received in the buffer will be completed;
determine a next fetch time, t4, to send a third GET request to the server for a third data chunk of the data item, based on the time t3 adjusted by a portion of the second measure of RTT; and
send the third GET request to the server for the third data chunk of the data item at about the time t4, wherein the first measure of RTT and the second measure of RTT are different.

5. The device according to claim 4, wherein the hardware processor is also operative to: issue a HEAD command at about the time t2; receive a corresponding HEAD response in the buffer in response to the HEAD command; determine if the HEAD response was received in the buffer while there was still data of the first data chunk in the buffer; and fine-tune the next fetch time, t4 based on whether or not the HEAD response was received in the buffer while there was still data of the first data chunk in the buffer.

6. The device according to claim 1, wherein the data item includes a plurality of data chunks, and wherein for each one data chunk of the data chunks currently being received, the hardware processor is operative to:
send a GET request to a server for the one data chunk;
measure the time between sending the GET request for the one data chunk and receiving an initial part of the one data chunk in the buffer yielding a measure of RTT from the client device to the server and back to the client device associated with the one data chunk;
estimate a time t3 when receipt of the last packet of the packets of the one data chunk currently being received in the buffer will be completed;
determine a next fetch time, t4, to send a third GET request to the server for a next data chunk of the data item, based on the time t3 adjusted by a portion of the measure of RTT associated with the one data chunk; and
send the third GET request to the server for the next data chunk of the data item at about the time t4.

7. The device according to claim 6, wherein the portion of the measure of RTT associated with the one data chunk is in the range of 0.2 to 0.8 times the measure of RTT associated with the one data chunk.

8. The device according to claim 6, wherein the portion of the measure of RTT associated with the one data chunk is in the range of 0.4 to 0.6 times the measure of RTT associated with the one data chunk.

9. The device according to claim 1, wherein the hardware processor is operative to obtain the first measure of RTT from the client device to the server and back to the client device based on measuring the time between sending the first GET request and receiving an initial part of the first data chunk in the buffer.

10. The device according to claim 1, wherein the hardware processor is operative to obtain the first measure of RTT from the client device to the server and back to the client device based on measuring the time it takes to connect to the server.

11. The device according to claim 1, wherein the hardware processor is operative to determine the next fetch time, t2, to send the second GET request to the server for the second data chunk of the data item, based on the time t1 adjusted for a half of the first measure of RTT and a correction factor for upstream delay from the client device to the server.

12. The device according to claim 11, wherein the hardware processor is operative to calculate the correction factor based on a size of the buffer and an observed bitrate of consumption of the data item.

13. The device according to claim 11, wherein the hardware processor is operative to calculate the correction factor based on a time duration that the buffer was empty between consuming one of the data chunks and a next one of the data chunks.

14. The device according to claim 1, wherein, while the first data chunk is being received in the buffer, the hardware processor is operative to: issue a plurality of HEAD commands; and receive a corresponding plurality of HEAD responses in response to the HEAD commands yielding a plurality of measurements of RTT.

15. The device according to claim 14, wherein, the hardware processor is operative to check each one measurement of RTT of the plurality of measurements of RTT to determine if t1 adjusted by a certain portion of the one measurement of RTT is within a certain limit of a current time; and assign the one measurement of RTT that is within the certain limit of the current time as the first measure of RTT for determining the next fetch time, t2.

16. The device according to claim 1, wherein the hardware processor is operative to:
determine a timing of obtaining the first measure of RTT based on an initial measure of RTT;
obtain the initial measure of RTT from the client device to the server and back to the client device;
determine a time, t0, based on the time t1 adjusted by a portion of the initial measure of RTT less a certain value; and
at about the time t0, obtain the first measure of RTT from the client device to the server and back to the client device.

17. The device according to claim 16, wherein the first measure of RTT is obtained by the hardware processor, based on the hardware processor querying a transmission protocol stack for a measure of transmission protocol delay and receiving a response from the transmission protocol stack with the transmission protocol delay.

18. The device according to claim 17, wherein the first measure of RTT is determined by the hardware processor based on the transmission protocol delay adjusted for application slop.

19. The device according to claim 1, wherein the hardware processor is operative to:
open a new session in parallel to a session already open for receiving the data item;
send a GET request to the server for a second data item on the new session; and
determine the first measure of round trip time (RTT) from the client device to the server and back to the client device based on a delay between sending the GET request for the second data item and receiving an initial part of the second data item.

20. A method comprising:
sending a first GET request for a first data chunk of a data item to a server;
receiving a plurality of packets of the first data chunk;
buffering the packets of the first data chunk;
processing the first data chunk for outputting data to an output device;
obtaining a first measure of round trip time (RTT) from the client device to the server and back to the client device;
estimating a time t1 when receipt of the last packet of the packets of the first data chunk in the buffer will be completed;
determining a next fetch time, t2, to send a second GET request to the server for a second data chunk of the data item, based on the time t1 adjusted by a portion of the first measure of RTT;
sending the second GET request to the server for the second data chunk of the data item at about the time t2;
receiving a plurality of packets of the second data chunk;
buffering the packets of the second data chunk; and
processing the second data chunk for outputting data to the output device.

* * * * *